United States Patent
Dousse et al.

(10) Patent No.: US 10,444,019 B2
(45) Date of Patent: Oct. 15, 2019

(54) GENERATING MAP DATA

(71) Applicant: HERE Global B.V., Eindhoven (NL)

(72) Inventors: Olivier Dousse, Berlin (DE); Jarmo Kemppainen, Sunnyvale, CA (US)

(73) Assignee: HERE Global B.V., Eindhoven (NL)

( * ) Notice: Subject to any disclaimer, the term of this patent is extended or adjusted under 35 U.S.C. 154(b) by 276 days.

(21) Appl. No.: 15/245,753

(22) Filed: Aug. 24, 2016

(65) Prior Publication Data

US 2017/0059328 A1    Mar. 2, 2017

(30) Foreign Application Priority Data

Aug. 28, 2015 (EP) .................................... 15182890

(51) Int. Cl.
  *G06F 19/00*   (2018.01)
  *G01C 21/16*   (2006.01)
  *G01C 21/20*   (2006.01)
  *G01C 21/32*   (2006.01)

(52) U.S. Cl.
  CPC ......... *G01C 21/165* (2013.01); *G01C 21/206* (2013.01); *G01C 21/32* (2013.01)

(58) Field of Classification Search
  CPC ..... G01C 21/165; G01C 21/206; G01C 21/32
  USPC ................................................ 701/400, 430
  See application file for complete search history.

(56) References Cited

U.S. PATENT DOCUMENTS

| 9,488,492 B2 * | 11/2016 | Samarasekera .... G06K 9/00637 |
| 2008/0036580 A1 * | 2/2008 | Breed ............... B60R 21/01536 340/438 |
| 2013/0166195 A1 | 6/2013 | Bandyopadhyay et al. |
| 2014/0186049 A1 * | 7/2014 | Oshima .............. H04B 10/1143 398/118 |
| 2014/0207517 A1 * | 7/2014 | Oshima ................ H04N 5/2356 705/7.29 |
| 2018/0197393 A1 * | 7/2018 | Gallo ..................... G08B 21/12 |

FOREIGN PATENT DOCUMENTS

| EP | 1818687 A1 | 8/2007 |
| EP | 2505961 A | 4/2013 |
| JP | 2007333998 A | 12/2007 |

OTHER PUBLICATIONS

SPSI, "Systematic parking space information" https://www.gruenden-live.de/ideenwettbewerb/6/2278, Aug. 4, 2015, with English Translation.
European Search Report for European Application No. 15 18 2890.2-1557, dated Oct. 2, 2016.
Särkkä, Simo. Bayesian filtering and smoothing. vol. 3. Cambridge University Press, 2013.

* cited by examiner

*Primary Examiner* — Ronnie M Mancho
(74) *Attorney, Agent, or Firm* — Lempia Summerfield Katz LLC

(57) ABSTRACT

An apparatus receives at least one set of sensor data from at least one mobile device. The sensor data was measured at a particular site and comprises at least motion related sensor data. The apparatus selects a set of parameter values for a parametric site model from a plurality of possible sets of parameter values. The set of parameter values is selected which has the highest likelihood that the parametric site model configured with the set of parameter values correctly represents the particular site in view of the received at least one set of sensor data.

19 Claims, 10 Drawing Sheets

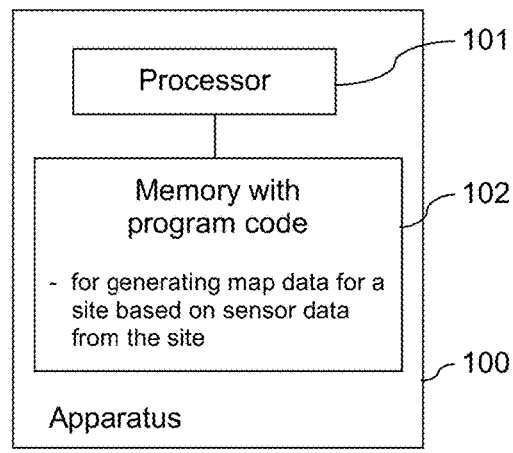

FIG. 1

| Receive at least one set of sensor data from at least one mobile device, the sensor data measured at a particular site and comprising at least motion related sensor data. | 201 |

| Select a set of parameter values for a parametric site model from a plurality of possible sets of parameter values, which has the highest likelihood that the parametric site model configured with the set of parameter values correctly represents the particular site in view of the received at least one set of sensor data. | 202 |

FIG. 2

GENERATING MAP DATA

This application claims the benefit of EP 15182890.2 filed on Aug. 28, 2015, which is hereby incorporated by reference in its entirety.

FIELD OF THE DISCLOSURE

The invention relates to digital maps and more specifically to the generation of map data.

BACKGROUND

Creating and updating maps is generally expensive. This can be alleviated by using crowd-sourcing for constantly and comprehensively collecting data forming the basis of the maps, as, for instance, in the case of OpenStreetMap®. In the case of crowd-sourcing, volunteer users may track their routes using a satellite signal based positioning, for instance using signals from the global positioning system (GPS) or any other global navigation satellite systems (GNSS), and manually input information associated with the respective position.

Satellite signal based positioning technologies, which are mainly used outdoors, are usually not suited to deliver a satisfactory performance when used for indoor positioning, since satellite signals of global navigation satellite systems do not penetrate through walls and roofs strongly enough for an adequate signal reception indoors.

Therefore, it may be a challenge to create accurate maps for some sites that are located indoors, like floors of parking houses.

Measurement results of inertial sensors arranged in a vehicle can be used to extrapolate the position of the vehicle inside a building, starting from a known position when entering the building. Such an approach is referred to as dead-reckoning. It is used for example in cars which generally rely on satellite signals for determining their position. Dead-reckoning may offer an accurate position for a certain time after satellite signals are lost.

SUMMARY OF SOME EMBODIMENTS OF THE INVENTION

An example embodiment of a method is presented, which comprises receiving at least one set of sensor data from at least one mobile device, the sensor data measured at a particular site and comprising at least motion related sensor data. The method further comprises selecting a set of parameter values for a parametric site model from a plurality of possible sets of parameter values, which has the highest likelihood that the parametric site model configured with the set of parameter values correctly represents the particular site in view of the received at least one set of sensor data. The method may be performed by an apparatus or in a distributed manner by a plurality of interacting apparatuses.

Moreover, an example embodiment of an apparatus is presented, which comprises means for causing an apparatus to perform the actions of any embodiment of the presented example method.

The means of the apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit. In certain embodiments, the means of the presented apparatus are processing means.

Moreover, an example embodiment of an apparatus is presented, which comprises at least one processor and at least one memory including computer program code, the at least one memory and the computer program code configured to, with the at least one processor, cause an apparatus at least to perform the following: receive at least one set of sensor data from at least one mobile device, the sensor data measured at a particular site and comprising at least motion related sensor data; and select a set of parameter values for a parametric site model from a plurality of possible sets of parameter values, which has the highest likelihood that the parametric site model configured with the set of parameter values correctly represents the particular site in view of the at least one set of sensor data.

Any of the described apparatuses may comprise only the indicated components or one or more additional components.

Moreover an example embodiment of a system is presented, which comprises any embodiment of any presented example apparatus. Optionally, the system comprises in addition at least one mobile device configured to collect at least one set of sensor data.

Moreover an example embodiment of a non-transitory computer readable storage medium is presented, in which computer program code is stored. The computer program code causes at least one apparatus to perform the actions of any embodiment of the presented example method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented apparatuses is an information providing apparatus.

In certain embodiments, any of the presented methods is a method for generating map data for a site. In certain embodiment, any of the presented apparatuses is an apparatus for generating map data for a site.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1 is a schematic block diagram of an example embodiment of an apparatus;

FIG. 2 is a flow chart illustrating an example embodiment of a method;

DETAILED DESCRIPTION OF THE FIGURES

Figure 3:
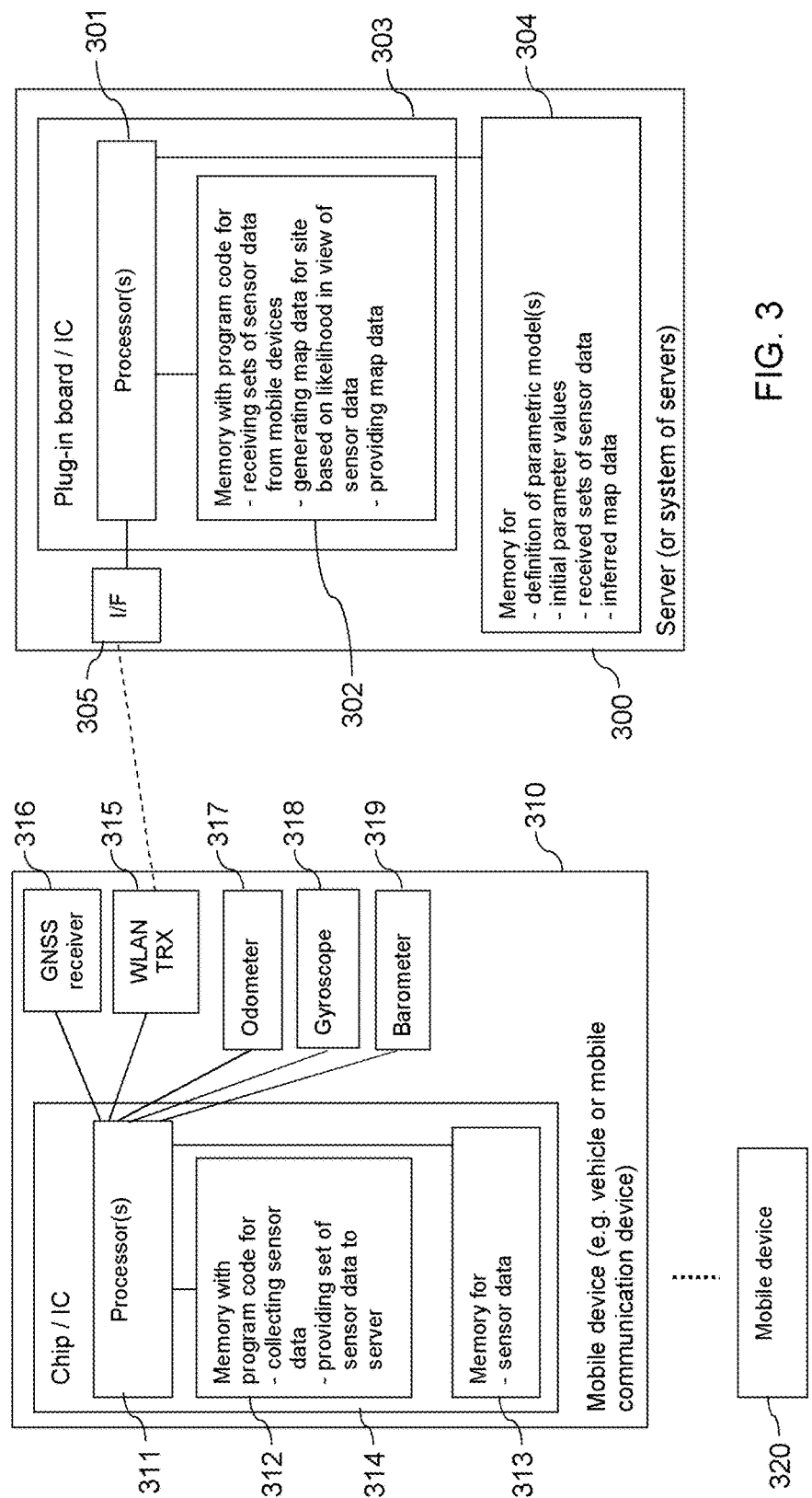
FIG. 3 is a schematic block diagram of an example embodiment of a system.

FIG. 1 is a schematic block diagram of an example embodiment of an apparatus 100 according to the invention. Apparatus 100 comprises a processor 101 and, linked to processor 101, a memory 102. Memory 102 stores computer program code for generating map data for a site based on sensor data from the site. Processor 101 is configured to execute computer program code stored in memory 102 in order to cause an apparatus to perform desired actions.

Apparatus 100 may be a mobile device or a stationary device. A stationary device is configured to be stationary when in operation and/or fixed to a particular location. Apparatus 100 may be for instance a server. Apparatus 100 may equally be a module, like a chip, circuitry on a chip or a plug-in board, for a device. Optionally, apparatus 100 may comprise various other components, like a data interface, a user interface, a further memory, a further processor, etc.

An example operation of apparatus 100 will now be described with reference to the flow chart of FIG. 2. The operation is an example embodiment of a method according to the invention. Processor 101 and the program code stored in memory 102 cause an apparatus to perform the operation when program code is retrieved from memory 102 and executed by processor 101. The apparatus that is caused to perform the operation may be apparatus 100 or some other apparatus, for example but not necessarily a server comprising apparatus 100.

The apparatus receives at least one set of sensor data from at least one mobile device, the sensor data measured at a particular site and comprising at least motion related sensor data (action 201). The mobile device may be a vehicle or may be embedded in, connected to, or otherwise be with a vehicle that may be of any kind of vehicle, like a car, a truck, motorcycle or a bicycle, etc. The mobile device may also be carried by a pedestrian. Motion related sensor data provides information on the motion of the mobile device, e.g. relating to a vehicle or a pedestrian, at the particular site. The data in a set of sensor data may have been measured, for instance, while the mobile device was moving around at the particular site; thus a set of sensor data may comprise sensor data measured at different positions at the particular site.

The apparatus furthermore selects a set of parameter values for a parametric site model from a plurality of possible sets of parameter values. The set of parameter values is selected, which has the highest likelihood that the parametric site model configured with the set of parameter values correctly represents the particular site in view of the received at least one set of sensor data (action 202).

The invention proceeds from the consideration that map data that is based on dead-reckoning degrades as the driven distance and/or the number of maneuvers, such as turns, increases. This effect is referred to as accuracy decay. It may thus not be suitable for generating accurate maps.

Certain embodiments of the invention therefore provide that a parametric model is used as a basis for defining a map of a site. The parametric model comprises various parameters. The parametric model may be configured by assigning values to the parameters. With different configurations, the parametric model represents different possible maps of sites. The parametric model may be configured to match a particular site by assigning suitable values to the parameters. Suitable parameter values of the parametric site model may be selected such that they fit best to one or more received sets of sensor data measured at the site of interest by one or more mobile devices, such as vehicles. The parametric site model configured with the selected set of parameter values may then be assumed to represent a map of the particular site.

Certain embodiments of the invention may have the effect that they enable a relatively cheap inferring of accurate map data for paths on which no satellite location signals, such as GNSS, are available. Using sensor data from a mobile device for determining parameter values of a parametric site model that fit best to a site may provide more accurate results than, for example, a dead reckoning approach, which may be subject to considerable drifts. Positioning and navigation applications may rely on the availability of accurate maps.

Apparatus 100 illustrated in FIG. 1 and the method illustrated in FIG. 2 may be implemented and refined in various ways.

An example embodiment further comprises storing the selected set of parameter values as map data for the site and/or providing the selected set of parameter values as map data for the site for transmission. In case more than one parametric site model may be used, a definition of the parametric site model or an identifier of the used model may be stored and/or provided for transmission as well. An example embodiment further comprises creating map data for the site based on the parametric site model configured with the set of parameter values. Such created map data may be stored and/or used for supplementing existing map data with the created map data and/or provided for transmission.

Any kind of such map data may be made available for instance as a basis for positioning, tracking and/or navigation computations for the site. Map data may be transmitted for instance to another server, like a map server or a positioning assistance server. Alternatively, it may be transmitted for instance directly to individual user devices, for example upon request of a user for map data for a particular site.

In an example embodiment, the particular site is a particular parking house. It may be of particular interest to enable a determination of exact maps within such parking houses. In this case, the parametric site model may be a parametric parking house model. It is to be understood, however, that the particular site is not limited to parking houses; it may also be, for instance, an extensive system of tunnels, an extensive system of building corridors and/or halls, a multilevel building, etc., or any combination thereof.

In an example embodiment a respective set of sensor data comprises data from an odometer and/or from a gyroscope and/or from a barometer. Sensor data from such three types of sensors in combination may be suited to provide comprehensive information on movements of a mobile device in three dimensions. An odometer may measure the distance travelled by a mobile device; if the mobile device is a vehicle or used along with a vehicle for instance by counting wheel ticks. It is to be understood that also a plurality of odometers may be used; this may allow performing individual odometric measurements on two or more wheels of a vehicle. Alternatively or in addition, an accelerometer may be used. Accelerometer data as well as individual odometric measurements for each wheel are typically available in modern cars. A gyroscope may track changes of horizontal orientation of a mobile device. Any suitable kind of gyroscope may be selected to this end, for instance a vibrating structure gyroscope. Using a gyroscope may provide more exact results than a detection of wheel orientation of a vehicle by a specific sensor, which may also be used in case the mobile device is a vehicle or used along with a vehicle. A barometer may provide atmospheric pressure values or—if implemented as a pressure altimeter—altitude values. In the latter case, the barometer may be regularly calibrated. Additionally, the sensor data may comprise location co-ordinate information, such as latitude and longitude values and/or altitude information, which may be too inaccurate as a basis for map data by itself. Such co-ordinate information may originate, for example, from an indoor positioning system, like a wireless local area network (WLAN) or a Bluetooth™ (BT) based system, or from a GNSS.

In an example embodiment, the parametric site model comprises parameters for defining a number of subareas, such as levels or floors, of the site. All or some of further parameters may then be provided separately for each subarea. Alternatively or in addition, the parametric site model comprises parameters for defining one or more lanes, such as driving lanes or walking paths, in each subarea of the site. The lanes may be represented for example as a collection of interconnected straight segments. The parameters defining the lanes may include parameters for position, length, orientation, width and driving direction for each lane, and a curvature of each connection of the lanes. Alternatively or in addition, the parametric site model comprises parameters for defining one or more connectors, such as ramps, stairs, elevators, escalators, etc. between subareas of the site. Such parameters may comprise for instance parameters for the number and position of connectors, for a shape of the connectors, for an indication of the subareas that are connected by the connectors and for one or more moving directions, such as a driving direction. The shape of the connectors may be taken for example from a dictionary of typical shapes, like straight or helicoid, etc. Alternatively or in addition, the parametric site model comprises parameters for defining at least one entrance to the site. Alternatively or in addition, the parametric model comprises parameters for defining at least one exit from the site. Similar as in the case of connectors, the parameters defining entrances and exits may be suited to define the number, position, moving direction or shape of entrances and exits, or any combination thereof.

In an example embodiment the received at least one set of sensor data comprises a plurality of sets of sensor data and selecting a set of parameter values for a parametric site model from a plurality of possible sets of parameter values comprises determining for each of the plurality of sets of sensor data for an initial set of parameter values for the parametric model a likelihood that the sensor data from the respective set of sensor data matches the parametric site model configured with the initial set of parameter values, determining a total likelihood for the initial set of parameter values as the product of the likelihoods determined for the plurality of sets of sensor data, and optimizing the total likelihood by adjusting the initial parameter values. The plurality of sets of sensor data may originate from a plurality of mobile device or from a single mobile device.

The total likelihood may be optimized for instance by recursively adjusting the initial parameter values using some standard optimization technique until the best achievable set of parameter values has been obtained. The initial parameter values may be fixed or be determined based on some available information on the site.

The likelihood that the sensor data from a respective set of sensor data matches the parametric site model configured with the initial set of parameter values may be determined for instance by applying a Bayesian smoothing. For the Bayesian smoothing, for example a Kalman smoother or a particle smoother may be used. For example details on Bayesian smoothing reference is made to "Simo Särkkä (2013). Bayesian Filtering and Smoothing. Cambridge University Press." A Bayesian smoothing may enable determining the most likely sequence of states of a mobile device on paths of a map defined by a parametric site model configured with given parameter values when considering sensor data, and indicate the likelihood for this sequence of states. A Bayesian smoothing may have the effect that it may provide more accurate results than, for example, a basic Bayesian filtering. A basic Bayesian filtering considers past and present measurements only for estimating a current state, while a Bayesian smoothing may consider past, present and future measurements for estimating a current state.

Searching the space of all possible sets of parameter values of a parametric site model may be very demanding, if the parametric site model has a certain complexity. Therefore, certain embodiments may first divide the parametric site model into a plurality of sub-models for different areas of the site. The areas may be selected in any desired manner, either based on user input or based on sensor data.

In an example embodiment, the received at least one set of sensor data comprises a plurality of sets of sensor data, and each received set of sensor data comprises altitude related data. Selecting a set of parameter values from a plurality of possible sets of parameter values may then comprise analyzing the altitude related data in the received sets of sensor data to detect levels at which the sensor data was measured. The received sets of sensor data for the site are then split to obtain a respective set of sensor data per level for each of the plurality of sets of sensor data. It is now possible to determine a likelihood of the respective set of sensor data for a level matching a parametric level model configured with an initial set of parameter values for the level, and to determine for each level a total likelihood of the initial set of parameter values as the product of the determined likelihoods for the level. The total likelihood for each level may be optimized by adjusting the initial parameter values. The adjusted parameter values resulting in the optimized total likelihood for each level may be combined to obtain a set of parameter values with optimized likelihood for the site. Different levels of the site may be for example different floors.

The altitude related data used in this example embodiment may be for example barometric data, but it could also be other kind of data, like floor numbers input by a user of the at least one mobile device. The barometric data may be any data output by barometers, that is, either pressure values or altitude values. Altitude related data may be particularly useful in splitting a comprehensive parametric site model into partial models for different areas, in case a site comprises several levels.

In an example embodiment, the set of parameter values for the parametric site model, which has the highest likelihood that the parametric site model configured with the set of parameter values correctly represents the site in view of the received at least one set of sensor data, is only selected if the highest likelihood exceeds a predetermined threshold value. This may have the effect that the best match is not automatically considered to be a good match, if the parametric site model is generally not suited for the geometry of a particular site.

In an alternative example embodiment, the set of parameter values for the parametric site model, which has the highest likelihood that the parametric site model configured with the set of parameter values correctly represents the site in view of the received at least one set of sensor data, is only selected if each highest likelihood that the parametric site model configured with the set of parameter values correctly represents a respective one of a plurality of subareas of the site in view of the received at least one set of sensor data exceeds a predetermined threshold value. This may have the effect that the highest likelihood that the parametric site model configured with the set of parameter values correctly represents the site as a whole in view of the received at least one set of sensor data does not have to be determined as a separate value, in case the selection of the set of parameter values is based on the likelihood for subareas.

An example embodiment further comprises receiving at least one further set of sensor data from at least one mobile device, the sensor data measured at the particular site, after a set of parameter values which has the highest likelihood that the parametric site model configured with the set of parameter values correctly represents the site in view of the previously received at least one set of sensor data has been selected, and further optimizing the selected set of parameter values based on the received at least one further set of sensor data. This may have the effect that a determined configuration of a parametric site model may be further refined when new sets of sensor data become available. Such an update may be less costly than the initial selection of a configuration, since it may be assumed that the previously selected parameter values are favorable initial parameter values. The update may be based only on newly received sets of sensor data, or on a combination of previously received sets of sensor data and newly received sets of sensor data.

FIG. 3 is a schematic block diagram of an example embodiment of a system, which allows inferring maps for a particular site, such as an extensive system of tunnels, an extensive system of building corridors and/or halls, multi-level buildings, etc., or any combination thereof based on sensor data collected by one or more mobile devices.

The system comprises a server 300 and one or more mobile devices 310, 320.

Server 300 may be for instance a dedicated server for generating maps of one or more particular sites, such as parking houses, or a navigation support server. It may be considered a server in the cloud. Alternatively, several servers in the cloud may take care of the tasks of server 300 in a distributed manner. Server 300 comprises a processor 301 that is linked to a first memory 302, to a second memory 304, and to an interface I/F 305.

Processor 301 is configured to execute computer program code, including computer program code stored in memory 302, in order to cause server 300 to perform desired actions.

Memory 302 stores computer program code for receiving sets of sensor data from at least one mobile device, and for causing storage of the sensor data, computer program code for generating map data for a respective site based on the likelihood of possible configurations of a parking house model and received sensor data, and computer program code for providing map data for further use. All of this computer program code may belong for instance to a map generation application. Some of the program code in memory 302 may be similar to program code in memory 102. In addition, memory 302 may store computer program code configured to realize other functions, for instance computer program code for supplementing existing maps with determined map data, for performing positioning or navigation computations for requesting entities, etc. In addition, memory 302 may also store any kind of data.

Processor 301 and memory 302 may optionally belong to a plug-in board, a chip or an integrated circuit 303, which may comprise in addition various other components, for instance a further processor or memory.

Memory 304 is configured to store data, including for example a definition of at least one parametric parking house model as an example parametric site model. The parking house model may be configured by setting various defined parameters. The number of parameters may vary depending on the configuration. The parameters may comprise for instance a parameter for setting the number of floors of the parking house. The parameters may comprise for instance parameters defining the driving lanes on each floor of the parking house, represented e.g. as a collection of interconnected straight segments. The parameters may comprise for instance parameters defining the number, position and shape of ramps between floors of the parking house. The parameters may comprise for instance parameters defining the driving direction on lanes and/or ramps. The parameters may comprise for instance parameters defining a position of an entrance to the parking house and a position of an exit from the parking house. Memory 304 may further be configured to store an initial set of parameter values for a default configuration of the parking house model. The initial set may correspond for instance to mean and/or median values of a number of parking houses. Memory 304 may further be configured to store sets of sensor data received from vehicles. Memory 304 may further be configured to store inferred map data. Memory 304 may be configured to store any other desired data as well. Memory 304 may be configured to store the indicated data in that it stores the data as data of a database, which defines a suitable structure for each of the indicated kind of data.

Interface 305 is a component which enables server 300 to communicate with other devices, like mobile devices 310, 320, for instance via the Internet and some wireless communication network. It may also enable server 300 to communicate with other entities, like other servers, for instance via the Internet. Interface 305 may comprise for instance a TCP/IP (Transmission Control Protocol/Internet Protocol) socket.

It is to be understood that server 300 may comprise various other components, like a user interface.

Component 303 or server 300 may be an example embodiment of an apparatus according to the invention.

Mobile device 310 may be instance a survey vehicle. Such a survey vehicle may be for instance a regular car, like a passenger car, but it may equally be any other kind of vehicle. A vehicle being a survey vehicle may be a main function of the vehicle or a minor additional function of a normal user vehicle. Alternatively mobile device 310 may be for instance any type of mobile communication device, for example a portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. Optionally, a mobile communication device may be connected, implemented, or embedded to/with a vehicle.

Mobile device 310 comprises a processor 311 that is linked to a first memory 312, to a second memory 313, to a wireless local area network (WLAN) component 315, to a mobile telecommunication component, to a wireless short range communication module, to at least one GNSS receiver 316, to an odometer 317, to a gyroscope 318, to an electronic compass, to an altimeter, to an acceleration sensor, to a wheel angle and/or rotation sensor or to a barometer 319, or any combination thereof.

Processor 311 is configured to execute computer program code, including computer program code stored in memory 312, in order to cause mobile device 310 to perform desired actions.

Memory 312 stores computer program code for receiving position estimates from GNSS receiver 316, computer program code for collecting and causing storage of sensor data from sensors 317 to 319 and computer program code for communicating with server 300. All of this computer program code may belong to a survey application. In addition, memory 312 may store computer program code configured to realize other functions, for instance computer program code of a navigation application. In addition, memory 312 may also store other kind of data.

Memory 313 is configured to store data, including sensor data of sensors 317 to 319. The sensor data may be stored as sets of sensor data, each set for a respective site. Memory 313 may be configured to store any other desired data as well.

Processor 311, memory 312 and memory 313 may optionally belong to a chip or an integrated circuit 314, which may comprise in addition various other components, for instance a further processor or memory.

WLAN component 315 may be configured to enable access to the Internet via a WLAN. Furthermore, instead of in addition to a WLAN component, mobile device 310 may comprise a cellular communication component enabling a communication via cellular communication networks.

The at least one GNSS receiver 316 may comprise any kind of GNSS receiver, for example a GPS receiver and/or a GLONASS receiver and/or a GALILEO receiver. It may be configured to receive corresponding satellite signals and to determine the current position of survey mobile device 310 based on the signals, possibly using provided assistance data.

Odometer 317 may be configured to count the wheel rotations of a wheel of a vehicle and to measure the distance travelled by the vehicle based on the count, in case mobile device 310 is a vehicle or configured to interact with a vehicle.

Gyroscope 318 may be configured to track changes of horizontal orientation of mobile device 310.

Barometer 319 may be configured to measure atmospheric pressure. If a pressure altimeter is used instead of a pure barometer, the component itself may in addition convert detected changes in atmospheric pressure into changes in altitude in the position of mobile device 310 and output an altitude value.

It is to be understood that mobile device 310 may comprise various other components, like a touchscreen or other user input and output means.

Other mobile devices 320 may be equipped in a similar manner as mobile device 310. It is to be understood that such other mobile devices 320 may be of the same type as mobile device 310 or of different types.

In the system of FIG. 3, at least one mobile device 310 and 320 collects sensor data, while server 300 receives and processes the sensor data to generate map data. Example operations in the system of FIG. 3 will now be described with reference to FIGS. 4 to 11.

Figure 4:
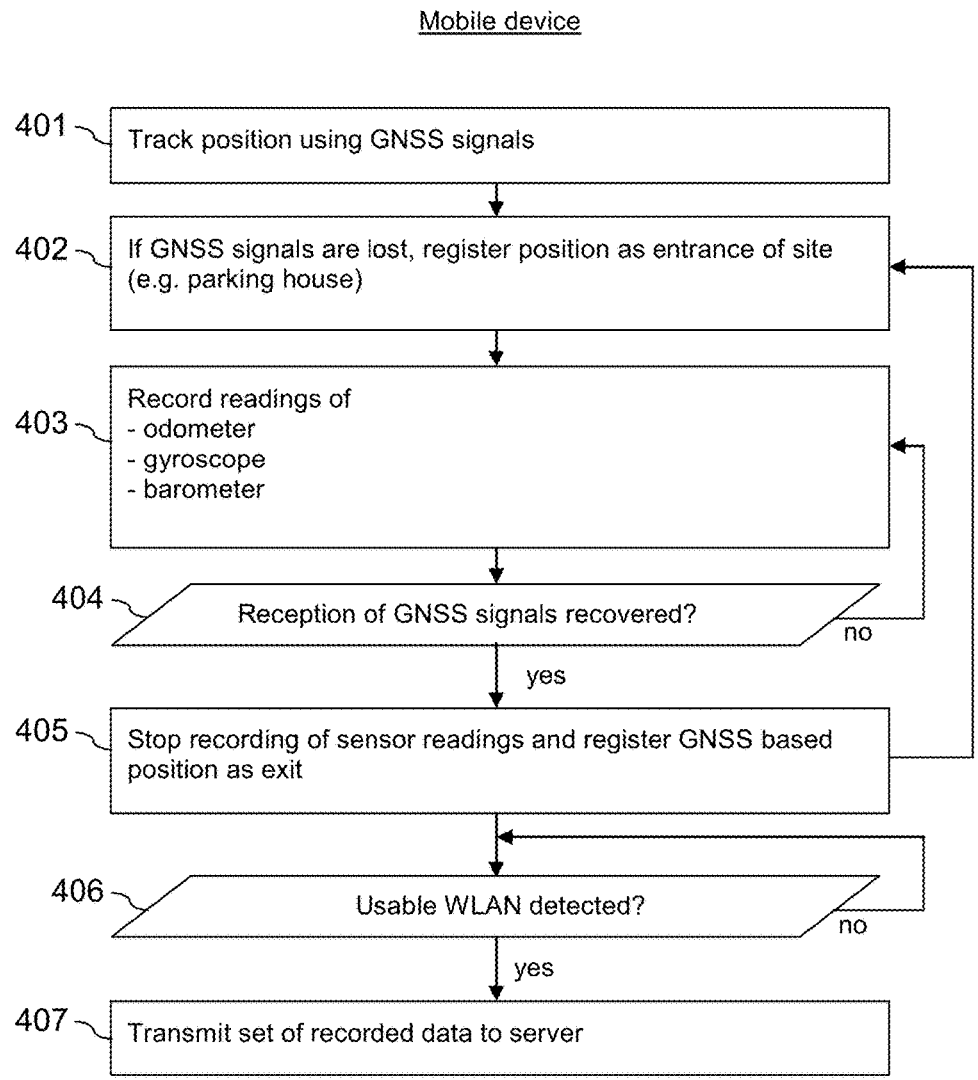
FIG. 4 is a flow chart illustrating an example embodiment of first operations in the system of FIG. 3.

FIG. 4 is a flow chart illustrating example operations at mobile device 310. Processor 311 and some of the program code stored in memory 312 may cause mobile device 310 to perform the presented actions when the program code is retrieved from memory 312 and executed by processor 311.

In the following, it is assumed by way of example that a particular site to be surveyed is a parking house and that mobile device 310 is a survey vehicle or permanently or temporarily associated with a survey vehicle. The survey vehicle may be driven by a survey person who specifically heads for various parking houses for which map data is missing. Alternatively, it may be driven by any user who agreed to run an installed survey application at least occasionally, and who enters a parking house for some private reason for which map data may be missing every now and then.

In mobile device 310, GNSS receiver 316 may generally be activated. While the survey vehicle moves in the open, GNSS receiver 316 tracks the position of mobile device 310 based on received satellite signals (action 401).

When the satellite signals are lost, or they become inaccurate over some threshold value, it may be assumed that the survey vehicle entered a parking house (or some other area in which map data may be missing). The last (or last accurate) satellite signal based position may be stored as approximate location of the entrance to the parking house (action 402). Alternatively, a user may be required to provide a user input when entering a parking house, for instance via a touchscreen of mobile device 310 or connected to mobile device 310. Such a touchscreen connected to mobile device 310 may be for instance a common touchscreen of various control components integrated into the vehicle. In this case, the user may also be requested to enter further information, for instance a name or address of the parking house. Further alternatively, a parking house may only be assumed to be entered, if the satellite signals are lost or deteriorate when a map used by a navigation system of the survey vehicle indicates a parking house in the immediate environment. In this case, the associated address may optionally automatically be registered as well.

Once the survey vehicle has entered the parking house, mobile device 310 starts recording the readings of various sensors, including readings of odometer 317, gyroscope 318 and barometer 319, etc. (action 403). The readings may be received and recorded at regular intervals, for instance once per second. Any other interval may be used as well. Additionally, mobile device 310 may start detecting and recording wireless beacon, such as the WLAN or BT, based location data.

The recording is continued until reception of satellite signals by GNSS receiver 316 is recovered (actions 404, 403).

Then, the recording of the sensor data is stopped. Alternatively, the recording may be stopped in response to a user input. The recorded readings are stored in memory 313 as sensor data in a set of sensor data. The set of sensor data is associated in memory 313 with the stored position of mobile device 310 and/or other information that may have been input by the user or automatically generated. In addition, a GNSS based position newly determined once the satellite signals have been recovered may be associated as well with the set of sensor data in memory 313 as approximate location of an exit of the parking house (action 405).

Mobile device 310 may continue with actions 401 to 405 for instance until the survey vehicle is parked or the survey application is stopped by the user.

Once a set of sensor data for at least one parking house has been assembled in memory 313, mobile device 310 scans for usable wireless communication networks, such as WLANs using WLAN component 315 (action 406). Such a usable WLAN may be for instance a WLAN covering a regular parking lot of the survey vehicle and which is operated by a company owning the survey vehicle, or it may be a private WLAN of a private user of mobile device 310, or it may be one of a number of free WLANs which do not require a password or for which a password has been stored previously for enabling an automatic connection.

When a usable WLAN is detected, a connection to server 300 is established and the stored set of sensor data and any associated data for one or more parking houses are transmitted via the WLAN and the Internet to server 300 (action 407). It is to be understood that alternatively, a cellular connection may be used by mobile device 310 for transmitting data to server 300.

The same or similar actions 401 to 407 may be performed by a number of other mobile devices 320.

Figure 5:
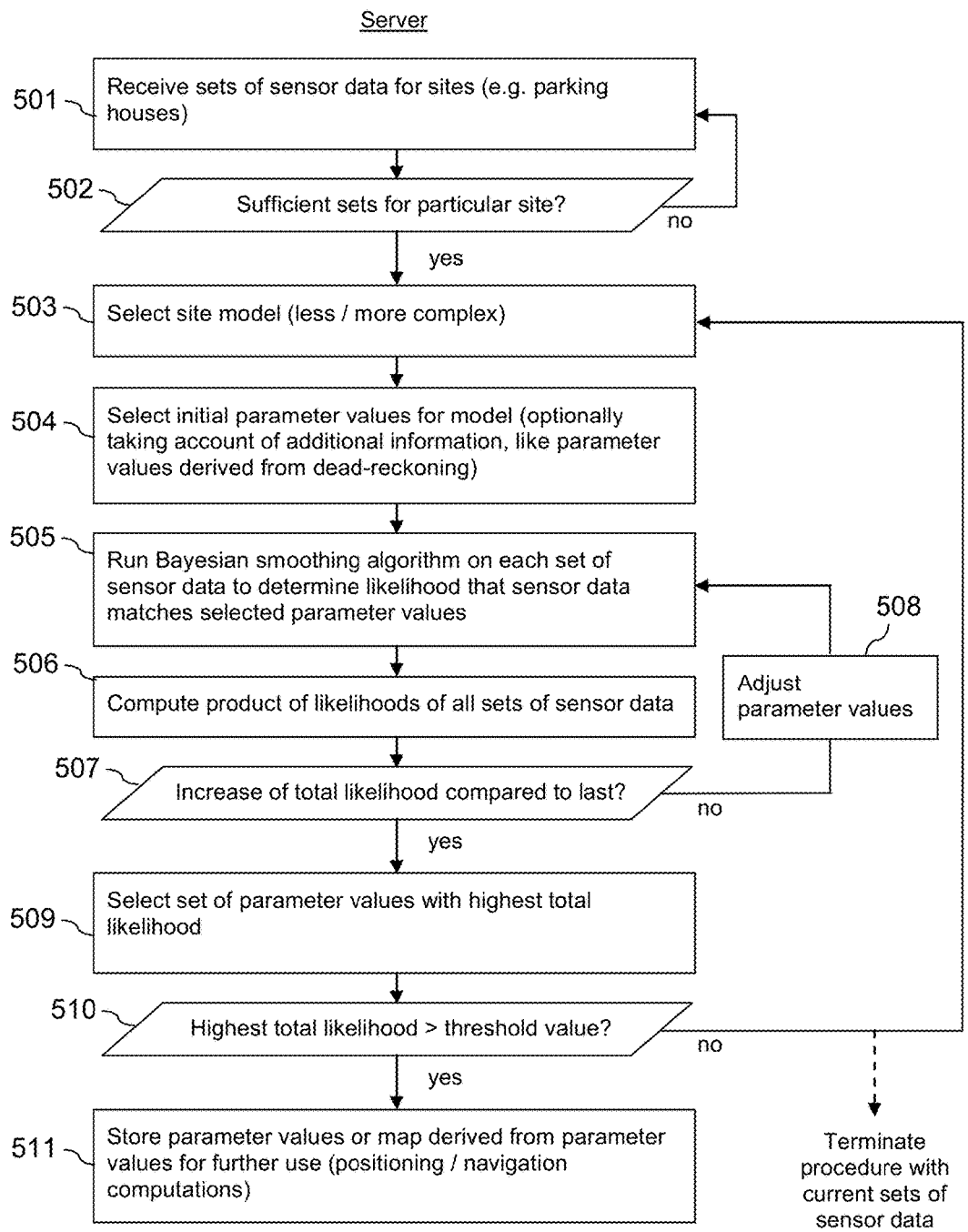
FIG. 5 is a flow chart illustrating an example embodiment of further operations in the system of FIG. 3.

FIG. 5 is a flow chart illustrating first example operations at server 300. Processor 301 and some of the program code stored in memory 302 of server 300 may cause server 300 to perform the presented actions when the program code is retrieved from memory 302 and executed by processor 301.

Server 300 receives sets of sensor data and associated data for several sites from at least one mobile device 310, 320 (action 501). It is to be understood that different sets of sensor data for a site may also originate from a single mobile device 310 visiting the same site several times.

Server 300 monitors for at least one particular site, including by way of example a particular parking house, whether a sufficient number of sets of sensor data has been received (action 502). Sets of sensor data for the particular parking house may be identified for instance based on an indication of a position or address received along with each set of sensor data.

When a sufficient number of sets of sensor data has been received for the particular parking house, server 300 selects a parametric parking house model (action 503). In case parking house models of different complexity are defined at server 300, a less complex parking house model may be selected at first, for instance, in order to limit the processing power. In case only a single model is defined in server 300, this action may be omitted. The parking house model defines with each set of parameter values for the tuple of parameters $x_1, x_2, \ldots, x_n$ another map of the drivable paths inside the parking house. The model defines the space of all possible parking house configurations of a given complexity and/or of a given structure. The space has a dimension n, and the parameters $x_1, x_2, \ldots, x_n$ allow defining the specificities of the parking house, such as the number of floors, the number and position of the ramps between the floors, etc.

Server 300 now searches for the parking house configuration that fits best to the received sets of sensor data.

To this end, sever 300 first selects an initial configuration for the model, that is, an initial parameter value for each parameter of the model (action 504). The initial parameter values may be predetermined and stored in memory 304. Such predetermined initial parameter values may be for instance known mean or median values for each of the parameters. Alternatively, the initial parameter values may be selected individually based on available information. For example, the number of floors of a parking house may have been input by users of at least some of mobile devices 310, 320. If there is a minimum number of inputs and all are the same, the value may be assumed to be correct. Further, the sensor data may be used at first for a dead-reckoning to generate a coarse map of the parking house. Parameter values derived from such a coarse map may then be used as initial parameters values in order to speed up the process.

Server 300 now runs a Bayesian smoothing algorithm on each set of sensor data to determine the likelihood that the sensor data matches the currently selected values for parameters $x_1, x_2, \ldots, x_n$ of the parking house model, for example as follows: The state of a vehicle is described by the respective position of the vehicle on the parking house model and its respective velocity. The position may be a three dimensional position (horizontal position and floor number) that is derived from the set of sensor data for a vehicle and constrained by a map as defined by the current configuration of the parking house model. The velocity may comprise speed and orientation as indicated by the sensor data. A Bayesian smoothing may consist in inferring the most likely sequence of states given the sensor data obtained for the vehicle, where the output includes the likelihood of this most likely sequence (action 505).

Server 300 then computes the product of the likelihoods that have been determined individually for each considered set of sensor data (action 506). The resulting value is a total likelihood that the currently assumed parameter values for model parameters $x_1, x_2, \ldots, x_n$ are suitable in view of the received sets of sensor data. In certain embodiments it may be desired to determine at least a first version of a map already based on a single set of sensor data from a single mobile device 310. In this case, the total likelihood may correspond to the likelihood for this set of sensor data and does not have to be determined separately.

In an alternative embodiment, the smoothing algorithm may also be performed on average values determined from several sets of data. An average value may be calculated for instance for each section of a route that has sensor data of at last one measurement instance in at least one set of sensor data. Average value sections may be connected to each other at points where they cross. If they are not yet crossing, the trajectory of an average value section may be extended to cross another section (that is, the closest one). In this case, the output of the smoothing algorithm may be considered to be the total likelihood and computing a product of likelihoods is not necessary.

Sever 300 may optimize the parameter values by subsequent adjustments in order to maximize the total likelihood (action 508). The adjustments may be determined using standard optimization techniques. For instance, a gradient descent on some educated initial guesses may be used. After each adjustment in action 508, the total likelihood of the currently assumed parameter values for model parameters $x_1, x_2, \ldots, x_n$ is determined in actions 505, 506, until it is determined in action 507 that there is no further increase of the total likelihood compared to the previously determined total likelihood.

In this case, the parameter values $x^*_1, x^*_2, \ldots, x^*_n$ resulting in the highest total likelihood are selected, that is, either the current or the previous set of parameter values (action 509).

Furthermore, server 300 determines whether the highest total likelihood exceeds a predetermined threshold value (action 510). If this is not the case, this indicates that the received sensor data cannot be matched to any configuration in the search space, and it may be assumed that the currently considered parking house has a geometry that cannot be represented by the parametric parking house model. This may be the case, for instance, if the used parking house model is too simple. In this case, the procedure may be terminated. Optionally, an indication may be presented to an operator of server 300 to inform the operator that a map of the parking house may have to be derived with a different approach. Alternatively, if a more complex parking house model is available for selection at server 300, this more complex parking house model may now be selected in action 503, and the described process (actions 504 to 510) may be repeated with this parking house model. Instead of a less complex model and a more complex model, there may also be different models of similar complexity for different types of parking houses that may be evaluated one after the other, until a suitable model is possibly found.

If the total likelihood exceeds a predetermined threshold value in action 510, the associated parameter values are considered valid, and server 300 may provide these parameter values for further use (actions 510, 511).

Server 300 may store the parameter values for instance in memory 304. They may be stored in association with some kind of identification of the parking house, like an address and/or a GNSS based position that was detected before entering the parking house and/or a GNSS based position that was detected after leaving the parking house. If several parking house models are available at server 300, the parameter values may be stored along with an indication of the used parking house model.

Alternatively or in addition, server 300 may provide the parameter values and associated data to some other server, either automatically or upon request.

Alternatively or in addition, server 300 may derive map data from the used parametric parking house model and the selected set of parameter values. Such map data may then be stored in memory 304 or transmitted to some other server. Such map data may be used by any server as individual map data for various parking houses. Alternatively, the map data may be used by server 300 or by some other server for supplementing a general map. Individual parking house specific map data or supplemented general map data may be used as a basis for presenting a map of the parking house on a display, for determining and indicating a position of a vehicle on a presented map and/or for navigation purposes. Individual parking house specific map data or supplemented general map data may also be transmitted by server 300 or by some other server to vehicles upon request, in order to enable them to update their stored map data.

When further sets of sensor data are received at server 300 for a particular parking house, for which a suitable final set of parameter values has already been determined and stored, these sets of sensor data may be used for updating the stored set of parameter values using actions 503 to 511. For the update, only the newly received sets of sensor data may be considered. Alternatively, the previously received sets of sensor data may be considered in addition, if these are being stored permanently or for a certain time in memory 304. In any case, the parameter values previously selected in action 509 may now be used as initial values in action 504. This may reduce the processing effort in the case of updates significantly.

The operations of FIG. 5 may be or belong to an example embodiment of a method according to the invention.

In particular if the parking house model is fairly complex, the space of all possible configurations of the parking house model may be large. Such a space may be difficult to search and the search may be very time consuming and require much processor capacity. In order to accelerate the search, alternative embodiments may divide the search space and search each partial space separately.

Figure 6:
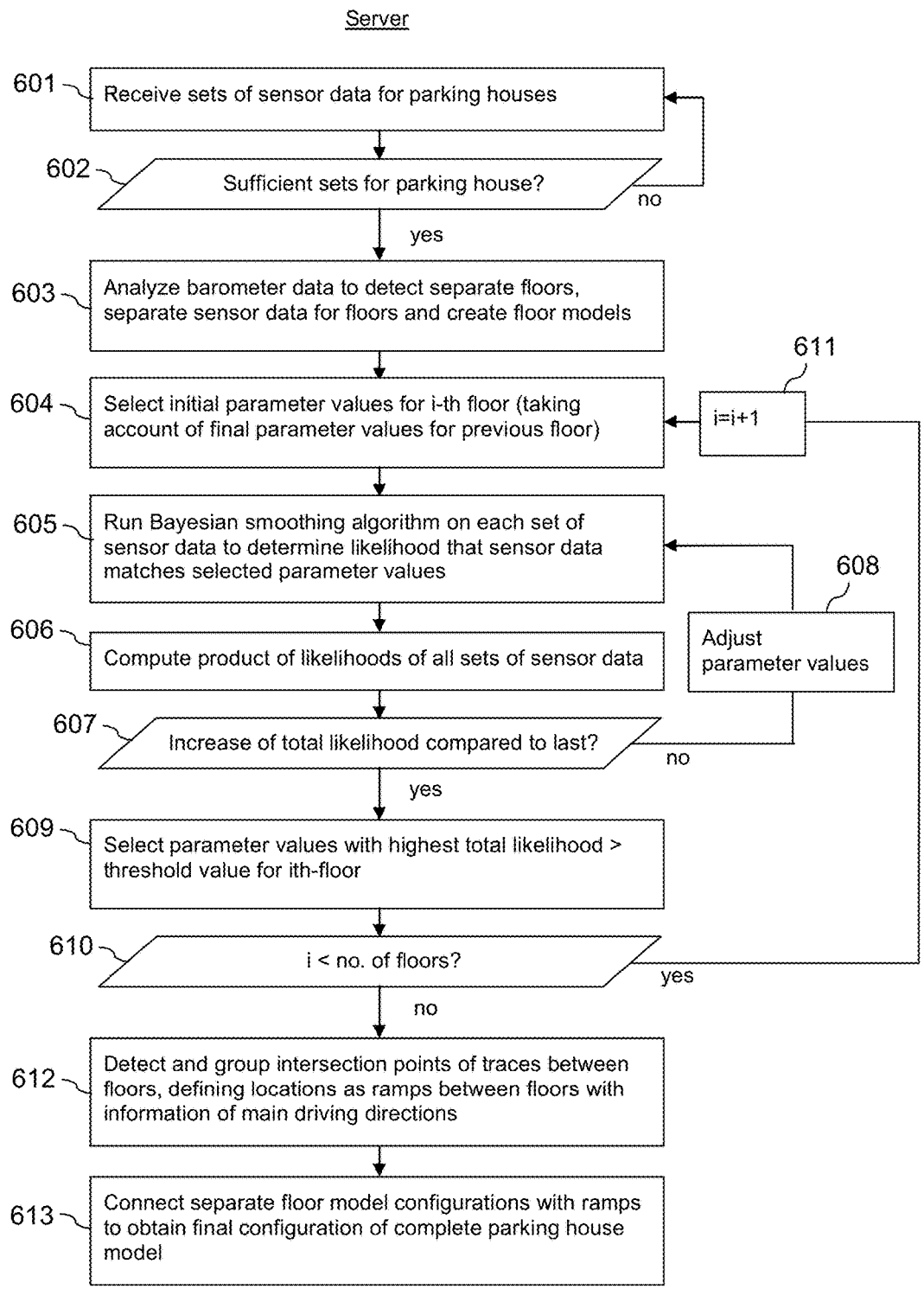
FIG. 6 is a flow chart illustrating an example embodiment of alternative further operations in the system of FIG. 3.

FIG. 6 is a flow chart illustrating example operations at server 300 of such an alternative example embodiment of a method according to the invention. Again, processor 301 and some of the program code stored in memory 302 of server 300 may cause server 300 to perform the presented actions when the program code is retrieved from memory 302 and executed by processor 301.

As in the case of the operations of FIG. 5, server 300 first receives sets of sensor data for parking houses from at least one mobile device 310, 320 and checks whether sufficient sets have been received for any of the parking houses (actions 601, 602).

It is assumed that only a single parking house model is available at server 300, thus a selection of a parking house model is not needed. It is to be understood, though, that also in this embodiment, there may be different parking house models that may be evaluated one after the other.

Sever 300 now analyzes altitude related data, such as the barometer data, from the sets of sensor data that have been received from different vehicles for a single parking house (action 603).

Figure 7:
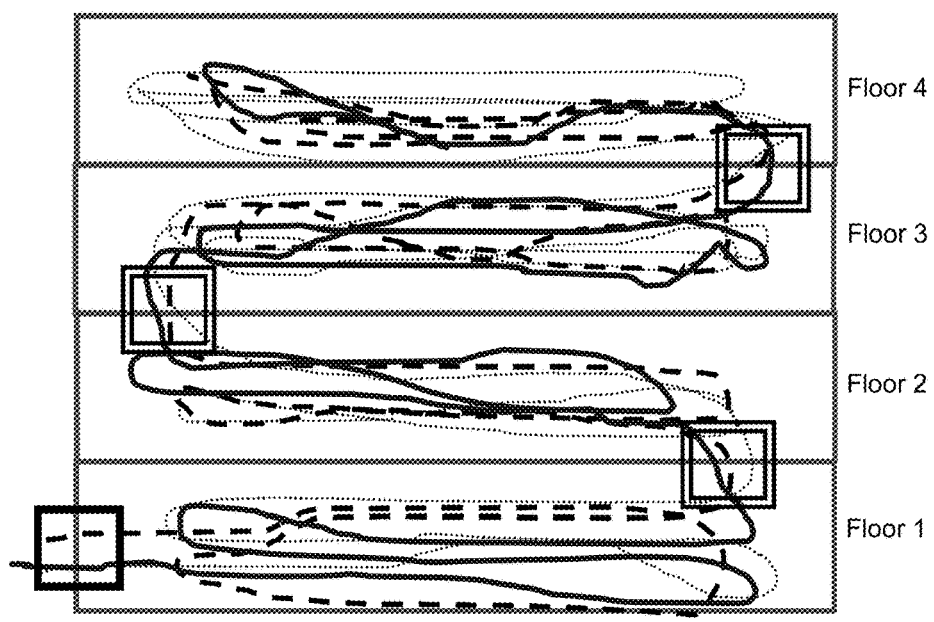
FIG. 7 is a diagram illustrating a detail of the operations of FIG. 6.

A representation of example altitude related data, such as the barometric data, is illustrated in FIG. 7. Here, the variation in height indicated by barometers of three example mobile devices moving in a parking house with four floors (Floor 1, Floor 2, Floor 3, Floor 4) is shown with a solid line, a dashed line and a dotted line, respectively. Special areas which represent the entrance to and/or exit from a floor are indicated with squares. The horizontal axis is for illustration only and not needed in the algorithm evaluating the barometric data.

At first, the barometric data sets are normalized. The normalization may facilitate the combined consideration of sensor data from different barometers, which may be calibrated differently, and/or of sensor data that may be measured and stored at different times and/or days. For instance, the first recorded value of the barometric data in each set of sensor data may be set to zero, and all subsequent value of the barometric data in each set of sensor data may be adjusted by the same amount.

The barometric data is then analyzed to detect separate floors. A new floor may be considered to be entered by a mobile device when there is a significant change of height in the sensor data, as indicated with double-lined squares between Floor 1 and Floor 2, Floor 2 and Floor 3, as well as Floor 3 and Floor 4 in FIG. 7. Alternatively or in addition, if the location of the significant change of the height in the sensor data of different data sets happens approximately at the same area or location for several mobile devices on the specific floor, a new floor may be considered to be entered. This approach may be used, if at least approximate location data (e.g. longitude/latitude values) is available. As a result, the number of floors and thus a reliable value of one of the parameters of the parking house model may be inferred.

Each received set of sensor data for the parking house is split into sub-sets of sensor data that is assumed to have been recorded on a respective one of the floors.

Figure 8:
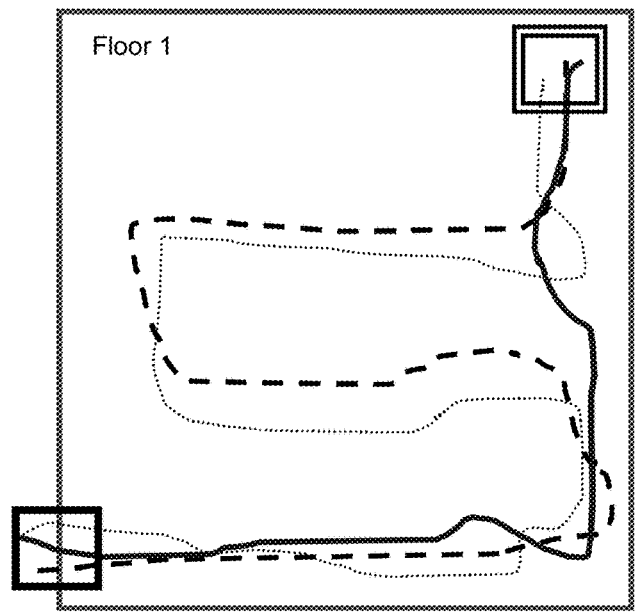
FIG. 8 is a diagram illustrating a detail of the operations of FIG. 6.
Figure 9:
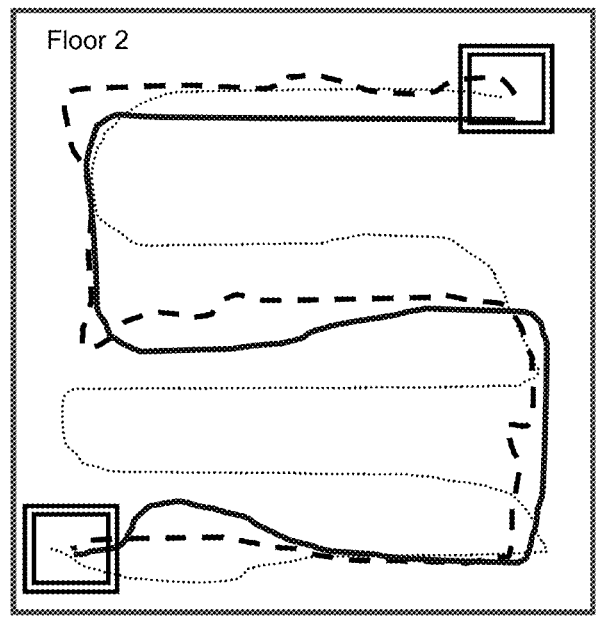
FIG. 9 is a diagram illustrating a detail of the operations of FIG. 6.

FIG. 8 is a diagram illustrating example traces of the three example mobile devices resulting from movements on Floor 1 only with a solid line, a dashed line and a dotted line, respectively, in a horizontal view. FIG. 9 is a diagram illustrating example traces of the three example mobile devices resulting from movements on Floor 2 only with a solid line, a dashed line and a dotted line, respectively, in a horizontal view. It is to be understood that the diagrams are for the purpose of illustration only. Server 300 processes individual sensor data directly, not trajectories that can easily be visualized in a figure.

In addition, a floor model is created for each floor. The floor model may be the same for all floors. A floor model may simply comprise all parameters of the parking house model that are provided for one of the floors. Some parameters may be used for more than one floor model, like parameters relating to ramps.

Now, the optimization described further above with reference to actions 504 to 508 of FIG. 5 for the entire parking house may be carried out for one of the floors only, for instance for the ground floor, Floor 1. That is, initial parameter values for the floor model are selected, for instance using predetermined initial values (action 604), a Bayesian smoothing algorithm is run on each set of sensor data for the floor separately to obtain a likelihood that the respective sensor data matches the selected parameter values (action 605), the product of the determined likelihoods for all sets of sensor data for the floor is computed to determine a total likelihood (action 606), and the parameter values are adjusted (action 608) for a further cycle (actions 605 to 606) until the total likelihood does not increase anymore (action 607).

When the total likelihood for Floor 1 does not increase anymore, the set of parameter values resulting in the highest total likelihood for Floor 1 is selected as final set of parameter values (actions 607, 609). The set of parameter values may only be selected as final set of parameter values, though, in case the highest likelihood exceeds a predetermined threshold value. If the threshold is not exceeded, the operation may be terminated or the floor may be marked as being non-mappable based on the available sensor data.

The optimization of actions 604 to 609 is then performed for the respective next floor, until a suitable set of parameter values (if any) has been found for each floor (actions 610, 611).

If a final set of parameter values was found for the first floor, this final set of parameter values may be selected as the initial set of parameter values for the floor model for the second floor and for any further floor in action 604. If the floors have the same structure, this may accelerate the procedure significantly.

In case it turns out that the selected final set of parameter values for the first floor is not suitable without significant amendments for the second floor, the configuration for the first floor may be used again nevertheless as initial configuration for the third floor. If the total likelihood determined in action 607 for the third floor is poor in the first iteration using these initial set of parameter values, the selected final set of parameter values for the second floor may be used as new initial set of parameter values for the third floor in action 604 of the second iteration to see whether this is a better starting point, instead of trying to adapt the final set of parameter values selected for the first floor. This may be useful since, for instance, the structure of Floors 1 and 3 may not match, while the structure of Floors 2 and 3 may match. Alternatively, for example, the structure of Floors 1 and 3 may match and the structures of Floors 2 and 4 may match, but the structures of Floors 1 and 2 or Floors 3 and 4 may not match, etc. Thus, for each floor, an initial set of parameter values may be selected based on any final set of parameter values that has previously been selected for another floor.

When a final set of parameter values has been selected for all floors, the floor models configured with these final sets of parameter values have to be combined, in order to obtain a complete set of parameter values for the parking house model as a whole.

To this end, server 300 detects and groups intersection points of traces between the floors (action 612). These intersecting points are indicated in FIGS. 7, 8 and 9 with double lined squares. They occur for instance at the location of ramps. The intersection points may be found where traces end at horizontally corresponding locations of two floors.

Server 300 may determine the locations of the intersection point groups, detect the main direction of motion at the intersection point groups, and define the locations as ramps between floors with information of main driving directions.

Server 300 may now connect the separate floor model configurations by defining the ramps between the floors to obtain the final configuration of the complete parking house model (action 613). In case it was not possible to select a final set of parameter values for one of the floors in action 609, this may be taken into account by marking the floor as not being mapped, instead of refraining from a mapping of the parking house as a whole.

Figure 10:
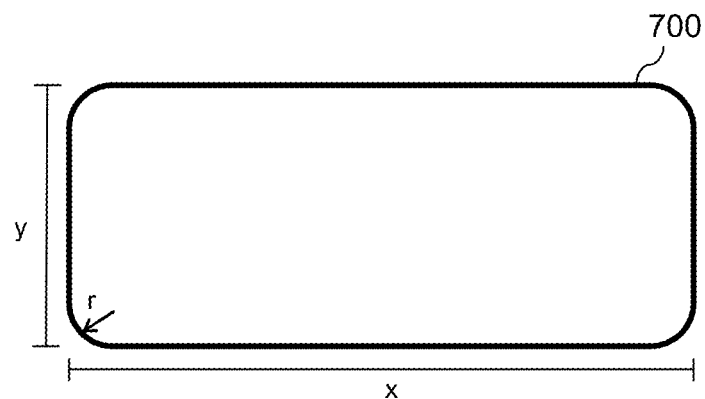
FIG. 10 is a diagram illustrating a simplified example of a parametric site model.
Figure 11:
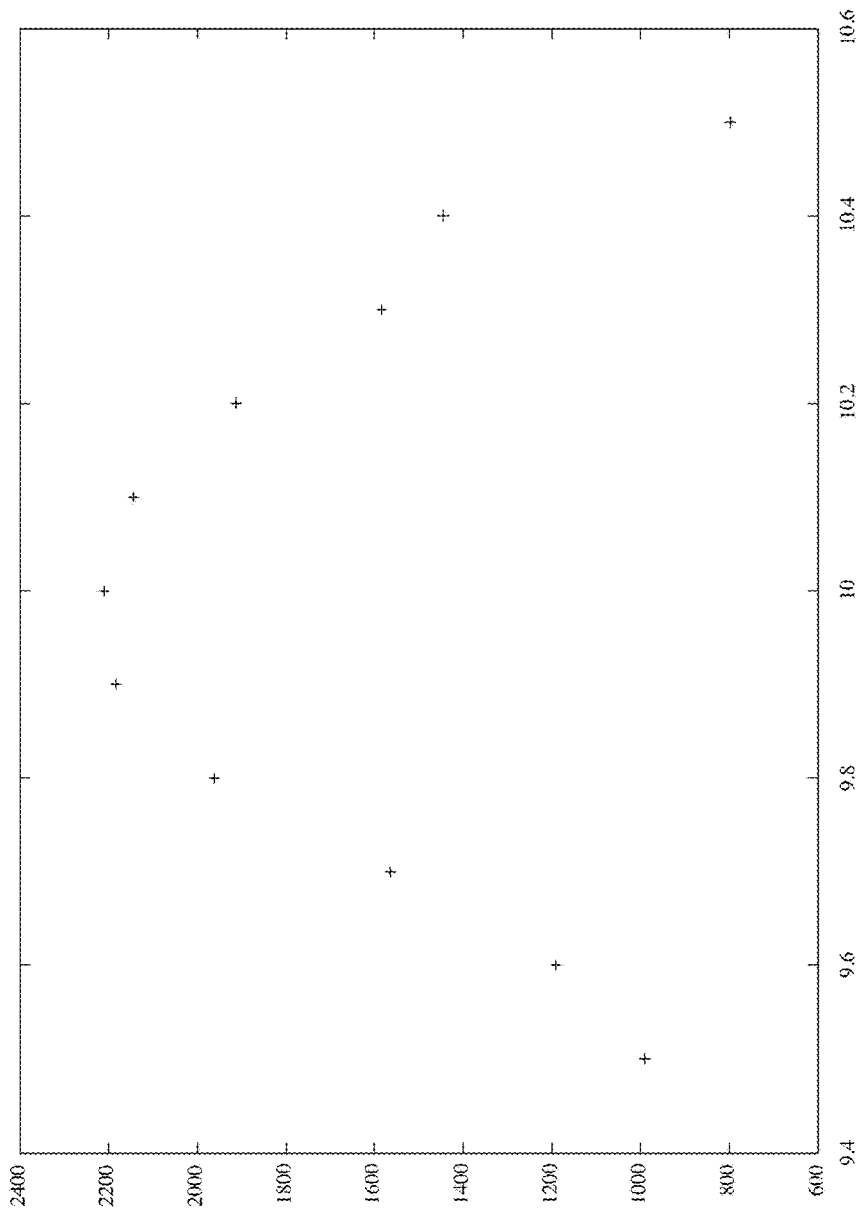
FIG. 11 is a diagram illustrating a possible distribution of likelihoods resulting by way of example for values of one example parameter with the site model of FIG. 10.

An embodiment of a method according to the invention is explained in addition based on a very simple example illustrated in FIGS. 10 and 11. For the example, a single-story parking house is considered. The driving lanes are in the form of a rectangle with uniformly curved angles. Such driving lanes 700 are shown in FIG. 10. This type of parking house may be represented by a parametric model having three parameters. The parameters are: length (x), width (y) and curvature of the angles (r). The true parameter values may be for instance x=10, y=5 and r=2. It is then possible to artificially generate sensor data including speed and orientation of a vehicle (with added measurement noise) driving five rounds (or five vehicles driving one round) in such a parking house. Next, a Bayesian smoothing (using an unscented Kalman filter) may be applied to the sensor data using different configurations of the model. It is expected that the configuration giving the best likelihood to the sensor data is the correct configuration. FIG. 11 now presents different likelihoods obtained for different values of parameter x. It can be seen that the likelihood is the highest for the correct value of x, namely x=10.

It is to be understood that the presented example systems, apparatuses and operations may be varied in many ways. The operations may be varied for instance by modifying actions, by omitting actions and/or by adding actions. In addition, the order of actions may be modified.

Summarized, certain embodiments of the invention allow inferring a map of a particular site, such as a parking house, from the recording of the raw inertial sensor readings of one or more mobile devices, such as vehicles, having moved or driven inside the parking house. They do not or not only rely on dead-reckoning, at least not for the final result, which allows avoiding the accuracy decay problem of dead-reckoning. The presented parametric model based approach may be of particular use in the case of multiple-storage parking houses. Dead-reckoning in such a parking house would require 3D free-space extrapolation, which is more challenging than standard map-constrained extrapolation. If the parking house is big and/or complex, dead-reckoning is likely to be too limited to extract a map of the parking house in the first place. Certain embodiments of the invention fuse sensor data from at least one mobile device in order to improve the accuracy of the resulting map. The more sets of sensor data are available for a parking house, the more accurate is the map that may be inferred. The individual sensor data does not have to be of high-quality. The presented approach allows replacing quality with quantity. The resulting map may be constantly improved as more mobile devices send sets of sensor data. Certain embodiments of the invention provide a cheap way of obtaining important map data. The computations that are required for complex parking models may be performed asynchronously in the cloud. The resulting maps of parking houses may be used for example for indoor navigation, but equally for any other desired purpose. The map content may be enriched in a way that facilitates the tracking of mobile devices vehicles inside the parking house. The approach may also be used for other sites than parking houses.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 12:
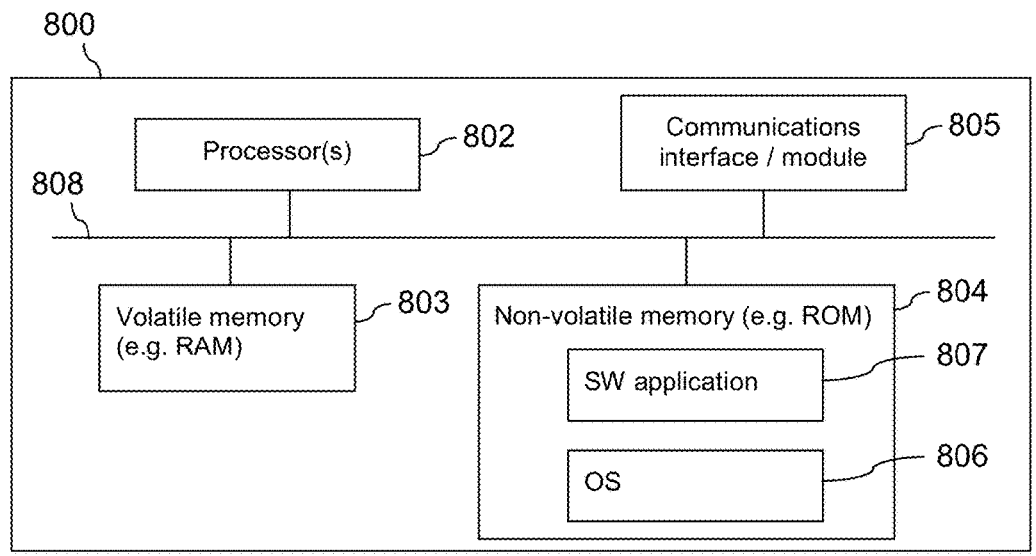
FIG. 12 is a schematic block diagram of an example embodiment of an apparatus.
Figure 13:
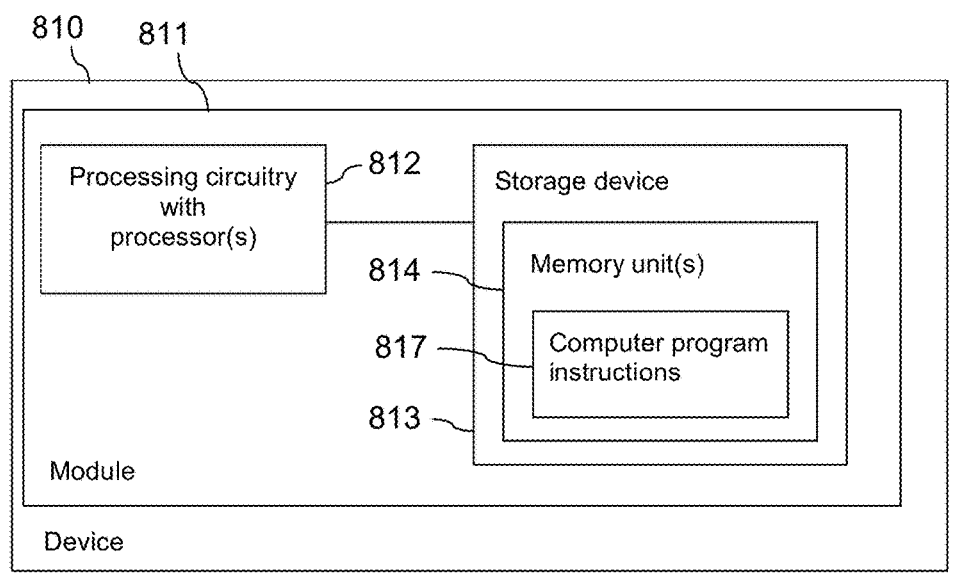
FIG. 13 is a schematic block diagram of an example embodiment of an apparatus.

Example embodiments using at least one processor and at least one memory as a non-transitory data medium are shown in FIGS. 12 and 13.

FIG. 12 is a schematic block diagram of a device 800. Device 800 includes a processor 802. Processor 802 is connected to a volatile memory 803, such as a RAM, by a bus 808. Bus 808 also connects processor 802 and RAM 803 to a non-volatile memory 804, such as a ROM. A communications interface or module 805 is coupled to bus 808, and thus also to processor 802 and memories 803, 804. Within ROM 804 is stored a software (SW) application 807. Software application 807 may be a positioning application, although it may take some other form as well. An operating system (OS) 806 also is stored in ROM 804.

FIG. 13 is a schematic block diagram of a device 810. Device 810 may take any suitable form. Generally speaking, device 810 may comprise processing circuitry 812, including one or more processors, and a storage device 813 comprising a single memory unit or a plurality of memory units 814. Storage device 813 may store computer program instructions 817 that, when loaded into processing circuitry 812, control the operation of device 810. Generally speaking, also a module 811 of device 810 may comprise processing circuitry 812, including one or more processors, and storage device 813 comprising a single memory unit or a plurality of memory units 814. Storage device 813 may store computer program instructions 817 that, when loaded into processing circuitry 812, control the operation of module 811.

The software application 807 of FIG. 12 and the computer program instructions 817 of FIG. 13, respectively, may correspond e.g. to the computer program code in any of memories 102 and 302, respectively.

Figure 14:
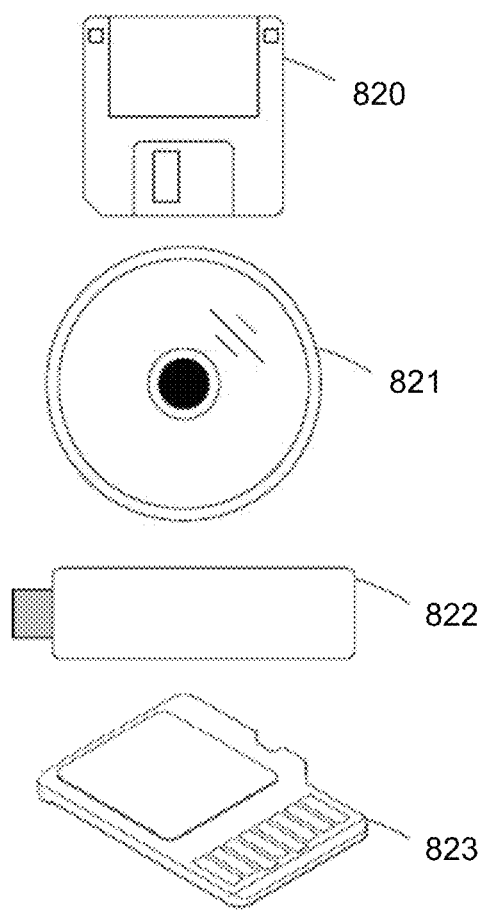
FIG. 14 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 14, which presents, from top to bottom, schematic diagrams of a magnetic disc storage 820, of an optical disc storage 821, of a semiconductor memory circuit device storage 822 and of a Micro-SD semiconductor memory card storage 823.

The functions illustrated by processor 101 in combination with memory 102, or processor 301 in combination with memory 302, or component 303 can also be viewed as means for receiving at least one set of sensor data from at least one mobile device, the sensor data measured at a particular site and comprising at least motion related sensor data; and means for selecting a set of parameter values for a parametric site model from a plurality of possible sets of parameter values, which has the highest likelihood that the parametric site model configured with the set of parameter values correctly represents the particular site in view of the received at least one set of sensor data.

The program codes in memory 102 and memory 302 can also be viewed as comprising such means in the form of functional modules.

FIGS. 2, 5 and 6 may also be understood to represent example functional blocks of computer program codes for generating map data for a site based on sensor data from the site.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

The invention claimed is:

1. A method comprising:
receiving at least one set of sensor data from at least one mobile device, the sensor data measured at a particular site and comprising at least motion related sensor data;
selecting a set of parameter values for a parametric site model from a plurality of possible sets of parameter values, which has the highest likelihood that the parametric site model, when configured with the set of parameter values, correctly represents the particular site in view of the received at least one set of sensor data;
generating, using a processor, map data for the particular site based on the set of parameter values; and
controlling, using the processor, a map server to generate or update a map using the map data.

2. The method according to claim 1, further comprising:
storing the selected set of parameter values as map data for the site;
providing the selected set of parameter values as map data for the site for transmission;
creating map data for the site based on the parametric site model configured with the set of parameter values and storing the created map data;
creating map data for the site based on the parametric site model configured with the set of parameter values and supplementing existing map data with the created map data; or
creating map data for the site based on the parametric site model configured with the set of parameter values and providing the created map data for transmission.

3. The method according to claim 1, wherein the particular site is a particular parking house.

4. The method according to claim 1, wherein the at least one set of sensor data comprises data from at least one sensor, including:
an odometer;
an accelerometer;
a gyroscope; or
a barometer.

5. The method according to claim 1, wherein the parametric site model comprises parameters for defining at least one of:
a number of subareas of the site;
lanes in each subarea of the site;
connectors between subareas of the site;
at least one entrance to the site; or
at least one exit from the site.

6. The method according to claim 1, wherein the received at least one set of sensor data comprises a plurality of sets of sensor data and wherein selecting the set of parameter values for the parametric site model from the plurality of possible sets of parameter values comprises:
determining for each of the plurality of sets of sensor data for an initial set of parameter values for the parametric site model a likelihood that the set of the sensor data matches the parametric site model configured with the initial set of the parameter values;
determining a total likelihood for the initial set of the parameter values as the product of the likelihoods determined for the plurality of sets of sensor data; and
optimizing the total likelihood by adjusting the initial parameter values.

7. The method according to claim 1, wherein the received at least one set of sensor data comprises a plurality of sets of sensor data, wherein each of the received sets of sensor data comprises altitude related data, and wherein selecting a set of parameter values from a plurality of possible sets of parameter values comprises:
analyzing the altitude related data in the received sets of sensor data to detect levels at which the sensor data was measured;
splitting each received sets of sensor data for the site to obtain a respective set of sensor data per level;
determining a likelihood of the respective set of sensor data for a level matching a parametric level model configured with an initial set of parameter values for the level;
determining for each level a total likelihood of the initial set of parameter values as the product of the likelihoods determined for the level;
optimizing the total likelihood for each level by adjusting the initial parameter values; and
combining the adjusted parameter values resulting in the optimized likelihood for each level to obtain a set of parameter values with optimized likelihood for the site.

8. The method according to claim 1, wherein the set of the parameter values for the parametric site model, which has the highest likelihood that the parametric site model configured with the set of parameter values correctly represents the site in view of the received at least one set of sensor data,
is only selected, if the highest likelihood exceeds a predetermined threshold value; or
is only selected, if each highest likelihood that the parametric site model configured with the set of parameter values correctly represents a respective one of a plurality of subareas of the site in view of the received at least one set of sensor data exceeds a predetermined threshold value.

9. The method according to claim 1, further comprising
receiving at least one further set of sensor data, the sensor data measured at the particular site, after a set of parameter values which has the highest likelihood that the parametric site model configured with the set of parameter values correctly represents the site in view of the previously received at least one set of sensor data has been selected; and
further optimizing the selected set of parameter values based on the received at least one further set of sensor data.

10. A computer readable storage medium in which computer program code is stored, the computer program code causing at least one apparatus to perform the following:
receive at least one set of sensor data from at least one mobile device, the sensor data measured at a particular site and comprising at least motion related sensor data;
select, using a processor, a set of parameter values for a parametric site model from a plurality of possible sets of parameter values, which has the highest likelihood that the parametric site model, when configured with the set of parameter values, correctly represents the particular site in view of the received at least one set of sensor data;
generate, using the processor, map data for the particular site based on the set of parameter values; and
control, using the processor, a map server to generate or update a map using the map data.

11. An apparatus comprising:
at least one processor and at least one memory including computer program code, and wherein the at least one processor is configured to execute computer program code from the at least one memory to cause the apparatus to at least perform:
receiving at least one set of sensor data from at least one mobile device, the sensor data measured at a particular site and comprising at least motion related sensor data; and
selecting a set of parameter values for a parametric site model from a plurality of possible sets of parameter values, which has a highest likelihood that the parametric site model, when configured with the set of parameter values, correctly represents the particular site in view of the received at least one set of sensor data;
generating map data for the site based on the parametric site model configured with the set of parameter values and storing the created map data; and
controlling a map server to generate or update a map using the map data.

12. The apparatus according to claim 11, wherein the apparatus is one of:
a chip;
an integrated circuit;
a plug-in board;
a module for a server; and
a server.

13. The apparatus according to claim 11, the at least one processor is configured to execute computer program code from the at least one memory to cause the apparatus to perform:
storing the selected set of parameter values as map data for the site; and
providing the selected set of parameter values as map data for the site for transmission.

14. The apparatus according to claim 13, the at least one processor is configured to execute computer program code from the at least one memory to cause the apparatus to perform:
supplementing existing map data with the generating map data.

15. The apparatus according to claim 13, the at least one processor is configured to execute computer program code from the at least one memory to cause the apparatus to perform:
providing the generated map data for transmission.

16. The apparatus according to claim 13, the at least one processor is configured to execute computer program code from the at least one memory to cause the apparatus to perform:
supplementing existing map data with the created map data; and
providing the created map data for transmission.

17. The apparatus according to claim 11, wherein the at least one set of sensor data comprises data from an odometer, an accelerometer, a gyroscope, a barometer, or combinations thereof.

18. The apparatus according to claim 11, wherein the parametric site model comprises parameters for defining a number of subareas of the site, lanes in each subarea of the site, connectors between subareas of the site, at least one entrance to the site, or at least one exit from the site.

19. The apparatus according to claim 11, wherein the set of the parameter values for the parametric site model, which has the highest likelihood that the parametric site model configured with the set of parameter values correctly represents the site in view of the received at least one set of sensor data, is only selected, if the highest likelihood exceeds a predetermined threshold value or is only selected, if each highest likelihood that the parametric site model configured with the set of parameter values correctly represents a respective one of a plurality of subareas of the site in view of the received at least one set of sensor data exceeds a predetermined threshold value.

* * * * *